July 15, 1941.  C. P. LEE  2,249,660
MILK COOLER
Filed March 25, 1940  3 Sheets-Sheet 1
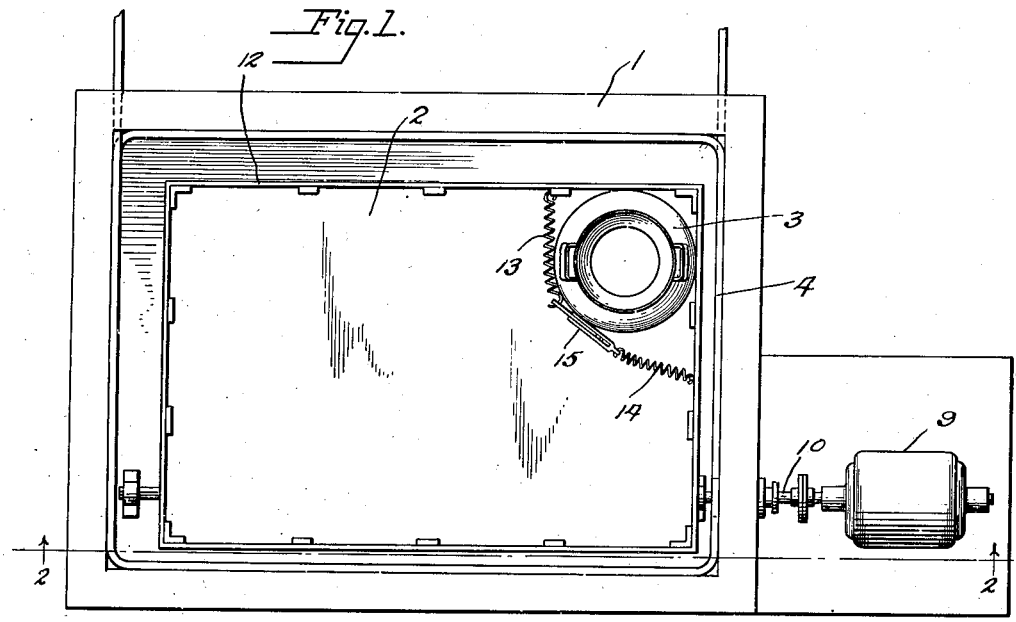
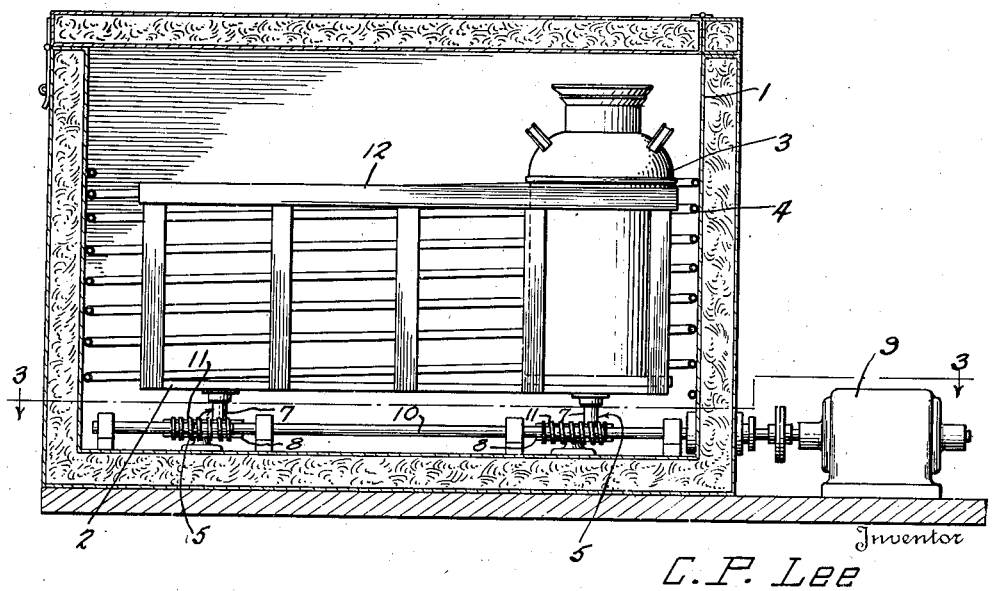
Inventor
C. P. Lee
By Mason Fenwick & Lawrence
Attorneys July 15, 1941.  C. P. LEE  2,249,660
MILK COOLER
Filed March 25, 1940  3 Sheets-Sheet 2

Inventor
C. P. Lee
By Mason Fenwick & Lawrence
Attorneys

July 15, 1941. C. P. LEE 2,249,660
MILK COOLER
Filed March 25, 1940 3 Sheets-Sheet 3

Inventor
C. P. Lee
By Mason Fenwick & Lawrence
Attorneys

Patented July 15, 1941

2,249,660

UNITED STATES PATENT OFFICE 2,249,660

MILK COOLER

Cornelius Peeples Lee, Atlanta, Ga., assignor to Larkin Coils, Inc., Atlanta, Ga., a corporation of Georgia Application March 25, 1940, Serial No. 325,863

9 Claims. (Cl. 257—75)

This invention pertains to apparatus for cooling liquids and particularly to means to cool milk rapidly. The invention is applicable particularly in dairies for rapid cooling of milk in cans.

The health laws of many states and municipalities require that warm milk containing animal heat shall be cooled within certain time limits. These time limits often are so brief that rather expensive equipment has been needed. Small producers cannot afford such equipment and in an effort to accomplish the required quick cooling often resort to crude methods to stir the warm milk in the can. This introduces bacterial contamination no matter how clean apparently the utensils may seem to be. Further, even the more elaborate equipment used by larger producers offer certain objections. For example, the usual aerator permits a film of milk to flow down over refrigerated surfaces though necessarily the moving film of milk is exposed to the atmosphere, and to resulting bacterial contamination.

The purpose of this invention is to permit milk once placed in the can when warm to remain in the can but to be cooled quickly. The rate of heat transfer from a body of milk, however, ordinarily is slow. Hence, while the outer areas of milk in the can may cool gradually, the central areas remain warm for a considerable portion of time. This necessarily increases the bacterial count in the milk and on warm days may even permit milk in the middle of the can to sour.

Necessarily, transfer of heat must be across the material of the container wall. Even when the container wall is of metal as is the case with the usual milk can, there are certain obstacles to retard transfer of heat through the metal. These obstacles comprise a relative slowing of the rate of heat removal at the inner wall where there is an interface between the milk and the metal. Retarded heat transfer occurs also at the outer interface between the can and surrounding water in which the can may be immersed. Where cans are submerged in water that is cooled by refrigerating coils, retardation of heat flow occurs also in the interface between the water of the cooling bath and the metal of the coils.

An object of this invention is to reduce lag of heat transfer through the respective interfaces as well as through the body of milk in a can. Also an object is to avoid contamination of the liquid in the container. A particular object of this invention is to arrange a support for milk cans that will be simple but will impart suitable flow of liquid past the walls through which the heat must flow; more particularly to impart a flow of milk past the walls of the can but without introducing any extraneous object such as a stirrer into the milk.

These objects and others will be apparent in the following description taken with the accompanying drawings of a preferred embodiment of this invention, and the novel features will be particularly pointed out in the appended claims.

In accordance with this invention important practical advantages are gained by supporting a milk can on a platform equipped with means to impart continued gyratory movement to the platform and to the can. Thus liquid within the walls of the can acquires a swirling motion. Thus, within the can, heat transfer from milk to metal is increased. Outside the can where the can is submerged heat transfer from metal to surrounding bath likewise is increased. This invention therefore accomplishes in simple and practical manner such improvement in heat transfer as accompanies renewal of liquid films at their interface with the metal wall.

This invention is illustrated with reference to a preferred embodiment thereof, though various advantages of the invention may be attained with other forms. Referring for illustration to the accompanying drawings—

Figure 1 shows in plan view a cooling tank in which a milk can is contained;

Figure 2 shows in longitudinal section along the line 2—2 of Figure 1 a view of refrigerating coils within which is a can-supporting platform and means to impart gyratory motion to the platform;

Figure 3:
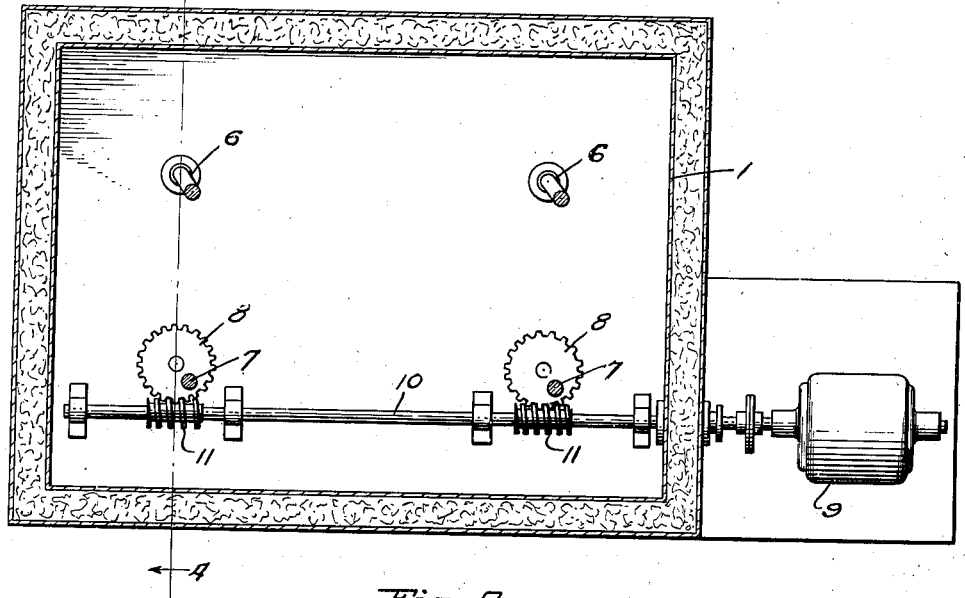
Figure 3 shows in horizontal section a view of the bottom of the cooling tank along the line 3—3 of Figure 2, with means to impart gyratory motion to the can-supporting platform.
Figure 4:
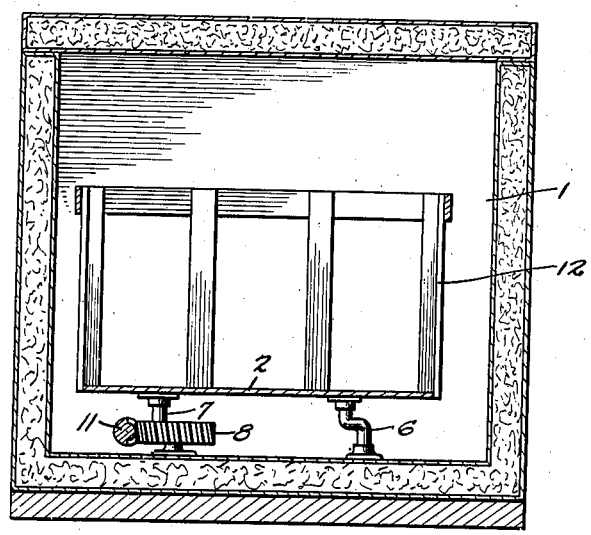
Figure 4 shows in transverse vertical section along the line 4—4 of Figure 3 a view near one end of the can-supporting platform and means to impart gyratory motion to the platform.

More particularly, as shown in the drawings, the preferred embodiment of the invention comprises a cooling tank 1 in which is a movable platform 2 for supporting a milk can 3. Within the tank are cooling coils 4. The platform 2 is supported upon pedestals designated generally as 5. In the form shown the platform is supported on four pedestals to form a stable base, one near each corner of platform 2. The cooling coils and cans on the platform may be submerged in liquid in the tank.

The arrangement of these pedestals and means to impart desired gyratory motion thereto are illustrated particularly in Figure 3. Two of the pedestals, designated as 6, extend vertically from a step bearing beneath the platform. These two pedestals 6 are in the form of an offset crank. Thus as the vertical pedestal rotates in its bearing, the upper, offset end affixed to the platform rotates in a circle of relatively small radius.

Supplemental pedestal supports for the platform, for example element 7, are positioned under the remaining corners of the platform. These pedestal elements 7 are mounted upon the face of circular gear elements 8 at a slight distance from the center of the gear so as to rotate in a circle. This circle corresponds in radius to that of the offset cranks 6. Thus as pedestals 6 and 7 rotate around their small circle a corresponding circular movement is imparted to the platform 2 resting thereupon. In effect the movement of the platform is oscillatory or more exactly is gyratory.

To effect the required movement of the platform pedestals 6 and 7, the two driving and supporting circular gears 8 are meshed with suitable driving means. Such means for example comprise a motor 9 from which a shaft 10 extends past the gears 8 with worm gears 11 contained on the shaft in such position as to engage the gear wheels 8. Thus is attained the speed reducing value of a worm gear connection so that in simple manner the speed of the motor is reduced to impart relatively slow gyration to platform 2.

To improve the readiness with which this apparatus may be used, means are provided to support individual milk cans separately upon the platform 2. Suitable means are illustrated in Figure 1. The can 3 is contained within a rack 12 that is built up from platform 2. Across appropriate sides of rack 12 extends a spring fastener comprising two coil springs 13 and 14 with a quick snapping link 15 therebetween. The can 3 is readily inserted within the confines of this resilient fastener.

Figure 5:
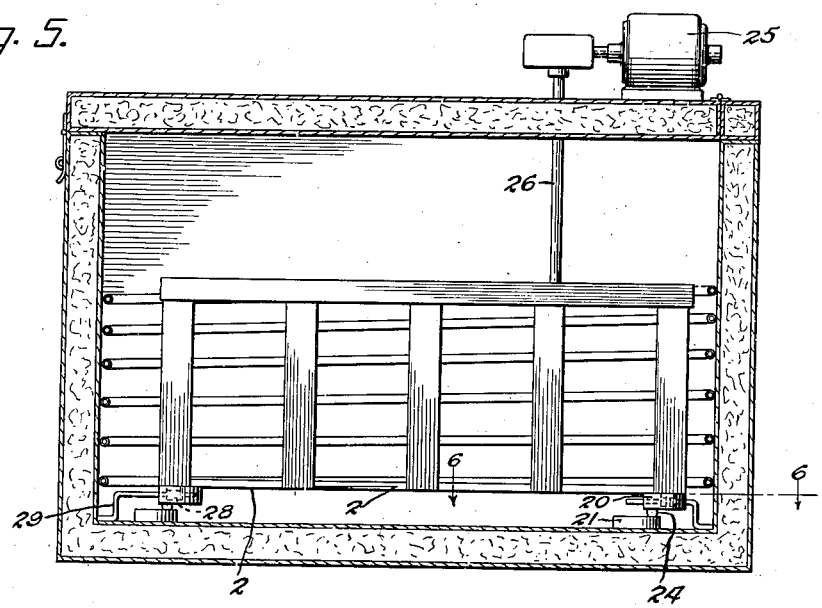
Figure 5 shows in longitudinal vertical section a view of a modified form of this invention in which a can-supporting platform is mounted on ball-bearing supports with means to oscillate the platform mounted above the cooling tank.
Figure 6:
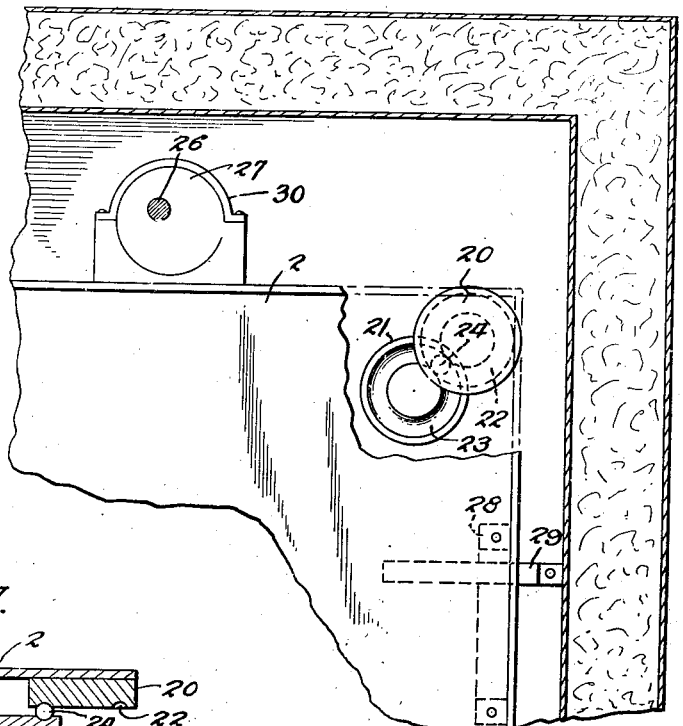
Figure 6 is a plan view along the line 6—6 of Figure 5 of a portion, enlarged, of the platform mounting and of means to clip the can platform to the bottom of the tank.
Figure 7:
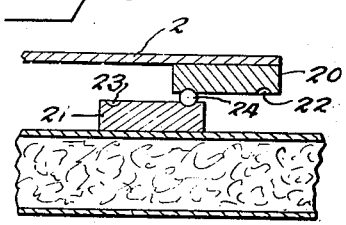
Figure 7 is a vertical section, enlarged, of a ball-bearing support for the platform.

With reference to the modification illustrated in Figures 5, 6 and 7, can-supporting platform 2 rests upon ball-bearing races in each corner in the form of a pair of superposed blocks 20 and 21. These blocks are mounted eccentrically to each other and each contains a circular groove 22 and 23 to receive a ball-bearing 24. Ball-bearing 24 is held in a position common to both grooves as the upper and movable block 20 is oscillated with respect to the lower block 21. Drive means may be as described or may be as shown in Figure 5 with a motor 25 mounted above the tank and the shaft 26 extending downwardly to a disc 27 affixed to the platform 2. The shaft 26 is secured eccentrically to the disc 27 and the disc 27 is held by the band 30 so that rotation of shaft 26 oscillates platform 2.

In order to hold platform 2 at the bottom of the tank a simple clip arrangement is applicable as shown in Figure 6. This may comprise a simple slotted member 28 in the nature of a slat spaced below the bottom of the tank. An arm 29 is secured to the side of the tank and extends into the slot of member 28. Thus reciprocating motion between the platform 2 and the rigid arm 29 is permitted as the platform oscillates, yet the platform is held in appropriate lower position. This arrangement permits of ready removal of rigid arm 29 so that platform 2 may be disengaged and removed as need be.

In use, such cans as are desired are placed on the platform. No particular attention need be paid to balance inasmuch as the pedestals at the corners of the platform form a rugged and well-based support. The cans may be added and removed as desired. The motor when started rotates the supporting pedestals so that gyratory motion of the platform results at once. The cans within their resilient confining means at once acquire the gyratory motion of the platform. Within the can, however, the continuation of this motion results in a swirling flow of milk. Thus the milk not only becomes intermixed but primarily flows continuously past the walls of the can.

Outside the can a cooling bath submerges a suitable number of refrigerating coils as is customary in many known forms of coolers. The motion of the can, however, not only imparts swirling motion to the milk within the can but gradually causes the cooling bath to circulate. Not only does the cooling liquid move in contact with the outer walls of the milk cans but gradually is caused to flow past the cooling coils. Further, there is pronounced tendency for cooling liquid to flow between cooling coils and milk cans. Thus both by convection and by improved interfacial heat transfer in the cans and at the coils is the overall heat exchange within the milk cooler raised to relatively high effectiveness. Under the present invention this is accomplished by means that are simple. The milk cans themselves participate.

While in accordance with the patent statutes I have set forth the principles of this invention and have illustrated a preferred practice thereof by specific example, it will now be apparent to those skilled in the art that modifications may be made within the scope of the appended claims.

What I claim is:

1. A cooler for milk or the like comprising a platform to support cans of milk, pedestals upon which the platform rests, the pedestals resting upon bearings and being offset therefrom so as to be movable in a circle, and means to rotate the pedestals about their respective bearings in unison.

2. A cooler for milk or the like comprising a platform to support cans of milk, pedestals upon which the platform rests, the pedestals resting upon bearings and being offset therefrom so as to be movable in a circle, means to rotate the pedestals in unison, and cooling coils disposed outside the platform whereby liquid in contact with the coils and with the cans is caused to circulate therebetween.

3. A cooler for milk or the like comprising a platform, means to secure cans of milk supported upon the platform, pedestal supports under the platform, a plurality of the pedestal supports being mounted upon fixed bearings and additional pedestal supports being mounted upon a rotatable gear disc, and a worm gear attached to the pedestal gear disc to move the platform with gyratory motion on the pedestal supports.

4. A cooler for milk and the like in cans comprising a platform, a plurality of pedestal supports therefor rotatable upon foot bearings, an upper portion of the pedestal being offset from the bearing portion, additional pedestal support under the platform being mounted upon a horizontal gear disc at a distance from the center thereof, and means to rotate the gear disc whereby to impart gyratory motion to milk cans on the platform.

5. A milk cooler comprising a platform and means to secure milk cans thereupon, cooling coils adjacent the platform, rotatable pedestals supporting the platform, a plurality of the pedestals being mounted upon foot bearings and offset therefrom, additional pedestal support being mounted upon a rotatable gear disc, and means to drive the gear disc, whereby the cans are oscillated to cause a swirling motion of liquid in the cans and to impart movement to liquid in which the cans may be submerged.

6. A cooler for milk and the like comprising, a platform to support cans of milk, a plurality of pedestals supporting the platform in a horizontal plane, each pedestal rotatable on a vertical axis and being disposed eccentric to its axis of rotation, and driving mechanism to rotate the several pedestals in unison.

7. A cooler for milk and the like comprising, a platform to support cans of milk, a plurality of pedestals supporting the platform in a horizontal plane, each pedestal rotatable on a vertical axis and being disposed eccentric to its axis of rotation, the degree of eccentricity of the several pedestals being uniform, and driving mechanism to rotate the several pedestals in unison.

8. A cooler for milk and the like comprising, an insulated chamber, a platform to support cans of milk within the chamber, a plurality of pedestals supporting the platform in a horizontal plane, each pedestal rotatable on a vertical axis and being disposed eccentric to its axis, cooling coils disposed within the chamber around the platform, and driving mechanism to rotate the several pedestals in unison.

9. A cooler for milk and the like comprising, a platform to support cans of milk, a rack surrounding the platform, resilient means secured to the rack to hold the cans upon the platform, a plurality of pedestals supporting the platform in a horizontal plane, each pedestal rotatable on a vertical axis and being disposed eccentric to its axis of rotation, and driving mechanism to rotate the several pedestals in unison.

CORNELIUS PEEPLES LEE.